United States Patent
Gupta et al.

(10) Patent No.: US 8,786,321 B2
(45) Date of Patent: Jul. 22, 2014

(54) POWER HARVESTING IN OPEN DRAIN TRANSMITTERS

(75) Inventors: Nitin Gupta, Gautam Budh Nagar (IN); Tapas Nandy, Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 53 days.

(21) Appl. No.: 12/982,583

(22) Filed: Dec. 30, 2010

(65) Prior Publication Data

US 2012/0169403 A1   Jul. 5, 2012

(51) Int. Cl.
  *H03B 1/00*  (2006.01)
  *H03K 3/00*  (2006.01)
(52) U.S. Cl.
  USPC ........................................... 327/108; 375/295
(58) Field of Classification Search
  USPC .................................. 327/108; 375/295–315
  See application file for complete search history.

(56) References Cited

U.S. PATENT DOCUMENTS

| | | | |
|---|---|---|---|
| 7,034,574 B1 * | 4/2006 | Li | 326/83 |
| 7,898,332 B2 * | 3/2011 | Deguchi et al. | 330/259 |
| 2004/0145392 A1 * | 7/2004 | Yoshikawa | 327/108 |
| 2005/0218941 A1 * | 10/2005 | Kushiyama et al. | 327/108 |
| 2008/0116935 A1 * | 5/2008 | Nair | 326/83 |
| 2008/0218212 A1 * | 9/2008 | Chiu | 326/68 |
| 2008/0218222 A1 * | 9/2008 | Nishi | 327/108 |
| 2008/0278122 A1 * | 11/2008 | Chi | 323/220 |
| 2009/0189442 A1 * | 7/2009 | Chi | 307/2 |
| 2009/0315592 A1 * | 12/2009 | Hidaka | 327/108 |
| 2010/0188175 A1 * | 7/2010 | Ishibashi | 333/22 R |
| 2010/0208778 A1 * | 8/2010 | Kim | 375/219 |

FOREIGN PATENT DOCUMENTS

JP   2006014268 A * 1/2006

* cited by examiner

*Primary Examiner* — Quan Tra
(74) *Attorney, Agent, or Firm* — Wolf, Greenfield & Sacks, P.C.

(57) ABSTRACT

A transmitter having at least one channel comprising a first differential circuit driven by a differential data signal, the first differential circuit configured to output the differential data at a first and second output and a first control circuit coupled between the first differential circuit and the first and second output, the first control circuit driven by a drive voltage.

26 Claims, 5 Drawing Sheets

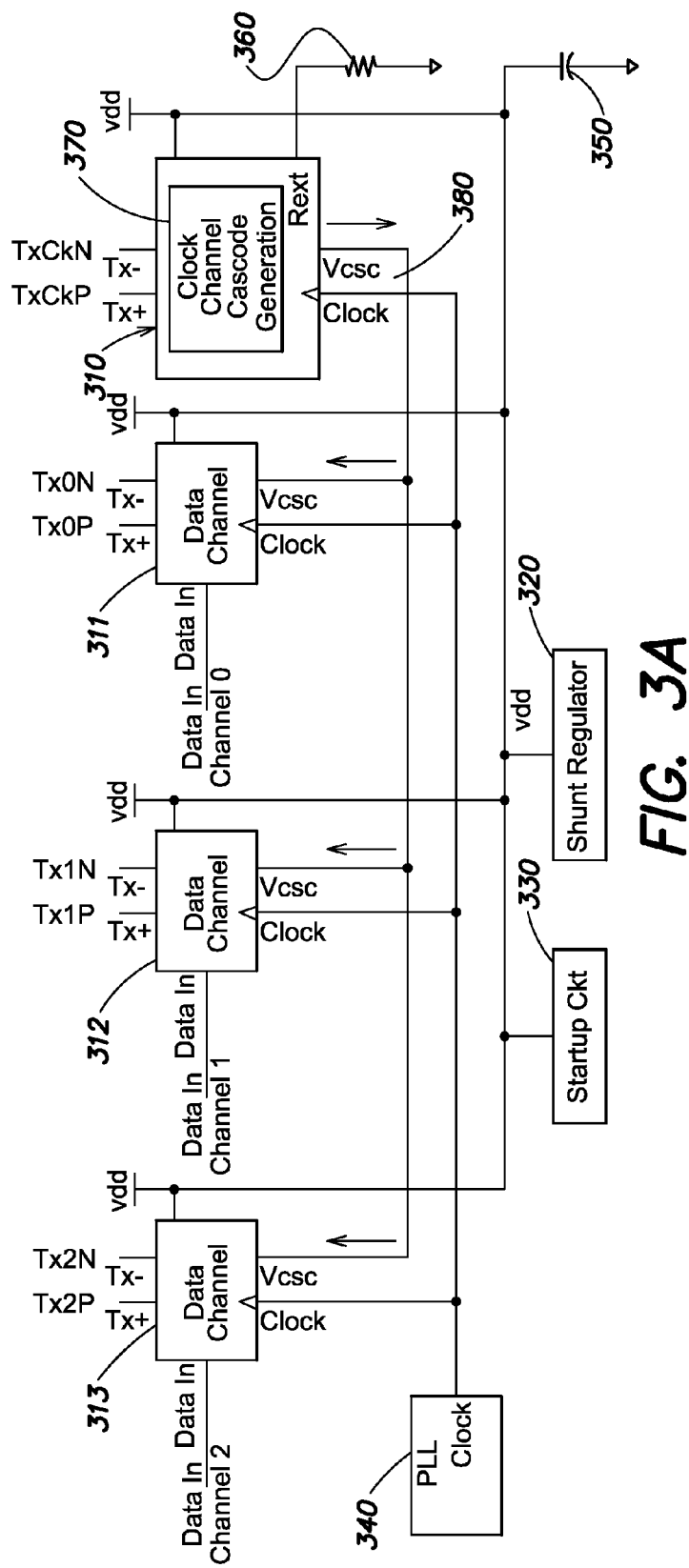
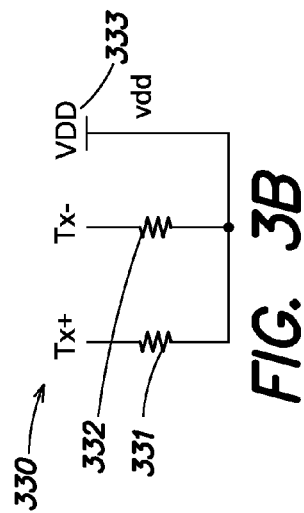
FIG. 3A
FIG. 3B

POWER HARVESTING IN OPEN DRAIN TRANSMITTERS

BACKGROUND OF THE INVENTION

1. Field of the Invention

The present application relates to methods and apparatus for power harvesting in open drain transmitter configurations. The application further relates to but is not limited to methods and apparatus for power harvesting for HDMI (high-definition multimedia interface) operation.

2. Discussion of the Related Art

In open drain transmitters, such as those in HDMI operation, a receiver provides a common mode bias voltage across receiver terminating resistors to an open drain of a transmitter. FIG. 1 shows an example of a typical open drain transmitter/receiver. A transmitter 110 comprises a differential pair of open drain transistors 111 which transmit differential data over lines TX− and TX+ to a receiver 120 over the channel 130. The transistors 111 draw current from a voltage source 121 of the receiver and a voltage drop across terminating resistors 123 and 122 is used to determine the transmitted data. A current source 112 is used to determine the current drawn from the receiver which may be in accordance with transmitter protocol. Typically the current is fed back to the receiver via a ground path 113 coupled between the transmitter 110 and receiver 120.

Recently, some approaches have attempted to harvest this HDMI current to provide power to the transmitter. Using power harvested from the HDMI current would negate the need for an additional power source for the transmitter. However because a pre-amplifier is used to switch the data signal passed by known transmitters, the harvested current requires a voltage boost to maintain a suitable voltage difference for the preamplifier. Level shifters within the pre-amplifier produces speed limits on the transmitter output.

An example of the known HDMI current harvesting is shown in FIG. 2. FIG. 2 shows an open drain differential pair of transistors NL0 and NL1. The gates of NL0 and NL1 receive differential data from a pre-amplifier 220 and the drains of the transistors NL0 and NL1 output data to pads TX− and TX+. Data is input to the pre-amplifier from a serializer 210. A drive current Idr through the differential transistors NL0 and NL1 is determined by a current sensor/control block 241 that receives a bias signal. The current sensor/control block 241 forms part of a voltage recovery circuit 240 which recovers the power in the drive current through use of a voltage regulator 243 to provide a supply to the serializer 210, preamplifier 220 and other circuitry.

In order to switch the transistors NL0 and NL1, the pre-amplifier 220 requires a supply higher than a voltage regulated from the drive current. A voltage booster 242 is required to provide the pre-amplifier 220 with a boosted voltage.

The circuit of FIG. 2 cannot take full advantage of power harvesting due to the additional power used by the voltage booster 242. Additionally the voltage booster 242 produces speed limits on the transmitter output.

Therefore a need exists for power harvesting that addresses the abovementioned limitations.

SUMMARY OF THE INVENTION

According to one aspect, there is provided a transmitter having at least one channel comprising: a first differential circuit driven by a differential data signal, the first differential circuit configured to output the differential data at a first and second output; and a first control circuit coupled between the first differential circuit and the first and second output, the first control circuit driven by a drive voltage.

The drive voltage may be generated using power received from a receiver.

The transmitter may further comprise: a voltage generation circuit coupled to the first differential circuit and configured to generate a source voltage Vdd for the transmitter wherein the source voltage Vdd is generated from a drive current of the first circuit.

The transmitter may further comprise: a first and second amplifier circuit configured to amplify the differential data signal.

The first and second amplifiers may be powered by the source voltage Vdd.

The first differential circuit may comprise a first differential transistor pair.

The first and second outputs may be open drain outputs.

The first control circuit may comprise a cascode transistor pair.

The respective first and second amplifier circuit may coupled to a respective gate input of a first and a second transistor of the first differential transistor pair.

The voltage generation circuitry may comprise a voltage regulator.

The voltage regulator may comprise: a shunt regulator coupled to a capacitor.

The transmitter may further comprise a drive voltage generating circuit comprising: a second differential circuit driven by the differential data signal coupled to a third and fourth output; and a drive voltage controller for controlling the drive voltage in response to a drive voltage control signal.

The drive voltage controller may be configured to receive a drive current of the second differential circuit.

The second differential circuit may be a second differential transistor pair.

The voltage circuit may further comprise: biasing circuitry configured to bias the second differential circuit such that a power dissipated by the drive current of the second differential circuit is negligible in relation to the drive current of the first differential circuit.

The third and fourth outputs may be open drain outputs

At least one of the at least one channels may further comprise: a drive voltage monitoring circuit comprising: a third differential circuit driven by the differential data signal, the third differential circuit configured to output the differential data at a fifth and sixth output; and a second control circuit coupled between the third differential circuit and the fifth and sixth output, the second control circuit driven by the cascode drive voltage.

A drive current of the third differential circuit may generate a voltage across an external resistor.

The drive current of the third differential circuit may be at most substantially 10% of the drive current of the first differential circuit.

The resistance of the external resistor may be configured to provide the voltage across the external resistor equal to the source voltage when the drive voltage corresponds to a predetermined value.

The predetermined value may correspond to a value of the drive voltage wherein the first control circuit is operable to provide a drive current responsive to the differential data signal.

The predetermined value of the drive voltage may correspond to the source voltage plus a threshold voltage of the first differential transistor pair being substantially greater than or equal to the cascode drive voltage minus a threshold voltage of the third differential transistor pair.

The third differential circuit may comprise a third differential transistor pair.

The fifth and sixth outputs may be open drain outputs

The second control circuit may comprise a cascode transistor pair.

The drive voltage generating circuit may further comprise: a comparator configured to generate the drive voltage control signal based on a comparison between the source voltage Vdd and the voltage across the external resistor.

The drive voltage controller may comprise: a control transistor with a gate connection configured to receive the drive voltage control signal and a drain input configured to receive the drive current and a source connection coupled to ground.

The transmitter may be an HDMI transmitter.

The transmitter may comprise four channels.

The at least one of the at least one channel may be a clock channel.

According to another aspect, there is provided an integrated circuit comprising a transmitter having at least one channel, the transmitter comprising:

a first differential circuit driven by a differential data signal, the first differential circuit configured to output the differential data at a first and second output; and a first control circuit coupled between the first differential circuit and the first and second output, the first control circuit driven by a drive voltage.

According to another aspect there is provided a circuit board comprising a transmitter having at least one channel, the transmitter comprising: a first differential circuit driven by a differential data signal, the first differential circuit configured to output the differential data at a first and second output; and a first control circuit coupled between the first differential circuit and the first and second output, the first control circuit driven by a drive voltage; wherein the circuit board further comprises: a capacitor; and an external resistor.

According to another aspect there is provided a system comprising: a transmitter having at least one channel, the transmitter comprising: a first differential circuit driven by a differential data signal, the first differential circuit configured to output the differential data at a first and second output; and a first control circuit coupled between the first differential circuit and the first and second output, the first control circuit driven by a drive voltage; the system further comprising: a drive voltage generating circuit comprising: a second differential circuit driven by the differential data signal coupled to a third and fourth output; and a drive voltage controller for controlling the drive voltage in response to a drive voltage control signal; wherein at least at least one of the at least one channels further comprises a drive voltage monitoring circuit comprising: a third differential circuit driven by the differential data signal, the third differential circuit configured to output the differential data at a fifth and sixth output; and a second control circuit coupled between the third differential circuit and the fifth and sixth output, the second control circuit driven by the cascode drive voltage.

According to another aspect there is provided a drive voltage generating circuit comprising: a first differential circuit driven by a differential data signal, the first differential circuit coupled to a first and second output; and a drive voltage controller for controlling a drive voltage in response to a drive voltage control signal.

According to another aspect there is provided a transmitter channel comprising: a drive voltage monitoring circuit comprising: a differential circuit driven by a differential data signal, the differential circuit configured to output differential data at a first and second output; and a control circuit coupled between the differential circuit and the first and second output, wherein the second control circuit is driven by a cascode drive voltage.

According to a seventh aspect there is provided a transmitter having at least one channel comprising: a first differential output means driven by a differential data signal for outputting the differential data at a first and second output; and a first control means coupled between the first differential circuit and the first and second output, for controlling a drive current through the first differential output means; wherein the first control means is driven by a drive voltage.

BRIEF DESCRIPTION OF THE DRAWINGS

Some embodiments will now be described by way of example only with reference to the accompanied Drawings in which:

FIG. 3a shows a circuit diagram of an open drain transmitter with four channels;

FIG. 3b shows a circuit diagram of a start-up circuit in use of the open drain transmitter of FIG. 3a;

FIG. 4a shows a circuit diagram of an open drain differential pair of transistors for a data channel of the transmitter of FIG. 3a;

FIG. 5a shows a circuit diagram for an open drain transmitter in the clock channel of the transmitter of FIG. 3a;

DETAILED DESCRIPTION

Figure 1:
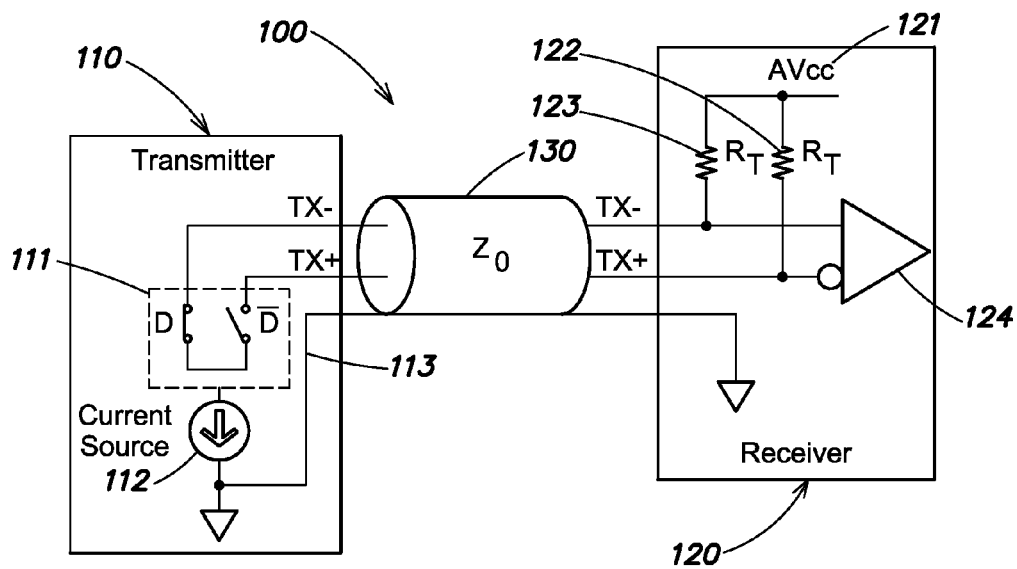
FIG. 1 shows a schematic of a typical open drain transmitter and receiver.
Figure 2:
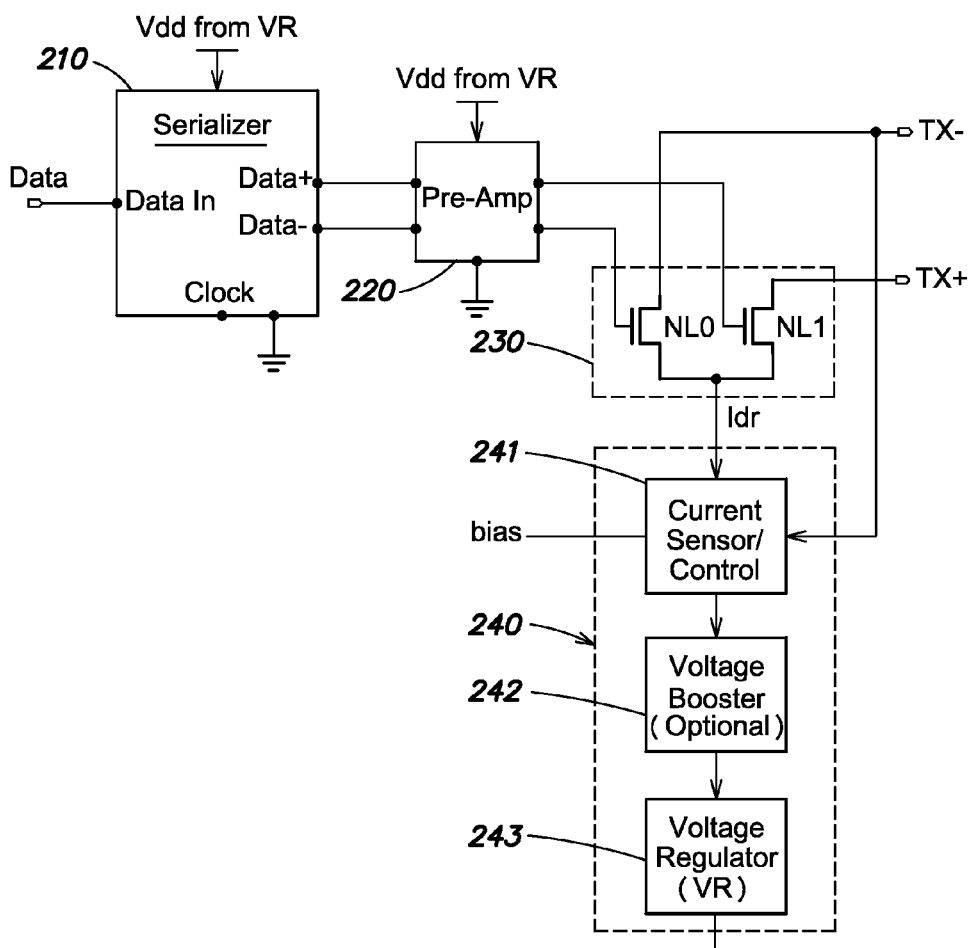
FIG. 2 shows a schematic of an open drain transmitter implementing known power harvesting.

Embodiments may provide a transmitter in accordance with HDMI (high-definition multimedia interface) operation. Embodiments may use a p-channel MOSFET (Metal-Oxide Semiconductor Field Effect Transistor) transistor pair to drive a transmitter with a cascode pair of n-channel MOSFET transistors located between the p-channel MOSFET drain connections and a pair of output pads. The cascode transistors may receive a cascode drive voltage Vcsc. The cascode drive voltage Vscs may be configured such that no voltage booster is required when $V_{csc} - V_{tn} <= V_{dd} + V_{tp}$. Embodiments may additionally provide an initial starting voltage Vdd by coupling a starting circuit to the output pads to enable the Vdd to be switched on when the device is off. Embodiments may generate Vcsc in a clock channel using an external resistor component.

In embodiments, the transmitter may be powered by a receiver source. The power harvested from the receiver may be sufficient to drive the transmitter logic and negate the need for a voltage booster. Embodiments may minimize power usage of the transmitter as well as maintaining a minimum switching speed of the transmitter. Embodiments may be particularly suited to transmitters for battery powered devices for example a battery powered device communicating via an HDMI cable.

Embodiments may be implemented on a board and/or on chip at the transmitting device. The board may include an HDMI socket to receive an HDMI cable. Parts of the transmitter may be implemented on an integrated circuit.

FIG. 3a shows an example of a four channel open drain transmitter according to an embodiment. It will be appreciated that the HSDMI specification requires four channels however the number of channels is not restrictive on the working of embodiments.

The transmitter of FIG. 3a comprises a clock channel 310, a first data channel 311, a second data channel 312 and a third data channel 313. Each data channel 311, 312, 313 receives a data input and provides two differential transmission outputs Tx0P and Tx0N, Tx1P and Tx1N, and Tx2P and Tx2N to the receiver respectively. Each of the four channels 310, 311, 312 and 313 is connected to a clock input from a phase lock loop (PLL) 340 and is connected to a voltage line Vdd. The voltage line Vdd may provide a source voltage to logic provided in the transmitter. The voltage line Vdd is further connected to a shunt regulator 320, a start-up circuit 330 and an external capacitor 350.

The clock channel 310 is connected to a clock input from the PLL 340 and has two differential clock outputs TxCKP and TxCKN. The clock channel is further connected to an external resistor 360. The clock channel comprises a clock channel cascode generation circuit 370 which generates a cascode drive voltage Vcsc. Vcsc may provide a biasing signal to data channels 311, 312 and 313 which may determine a drive current of the data channel.

The shunt regulator 320 and the external capacitor 350 may form a voltage regulator which may harvest power from a receiver using current drawn from the receiver source. The voltage regulator may only provide power when the transmitter is on, therefore the start up circuit 330 may be used to provide Vdd when the transmitter is in a power down mode or at a start up of the transmitter.

FIG. 3b is a circuit diagram of a start-up circuit provided in embodiments. The start up circuit comprises two connectors Tx+ and Tx− which may be connected to the receiver at the start up or during the power down mode of the transmitter. A start-up circuit may be provided for each of the channels 310, 311, 312, 313. The start-up circuit may be selectively connected to the transmit lines of the respective circuit or may be continuously connected to the transmit lines.

The connectors Tx+ and Tx− are connected to a first start up circuit resistor 331 and a second start up circuit resistor 332. When the Tx− and Tx+ connectors of the start up circuit are connected to the receiver, the Tx+ connector connects to a first terminating resistor of the receiver and the Tx− line connects to a second terminating resistor of the receiver, each terminating resistor is connected to a receiver power supply AVcc. The first and second resistors 331 and 332 of the start up circuit may further be connected in series to the Vdd line and may provide a voltage on this line when in use.

Figure 4A:
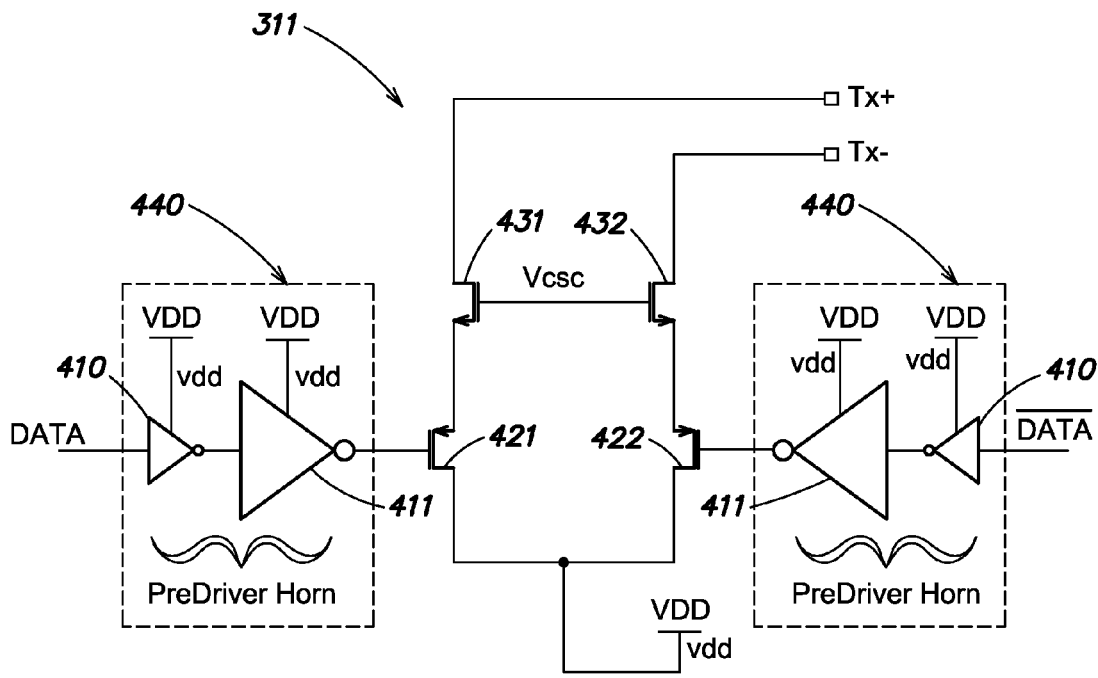
Figure 4B:
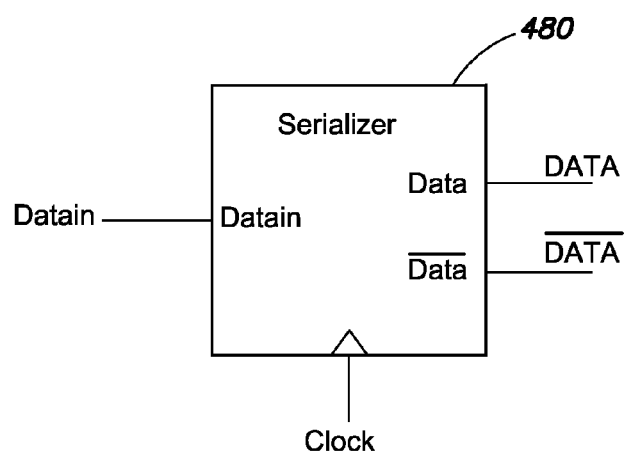
FIG. 4b shows a serializer for use in the open drain transmitter of embodiments of the present invention.

FIG. 4a shows the circuitry of an exemplary first data channel 311. It will be appreciated that second and third data channel and further additional channels may comprise similar circuitry. Before data is input to data channel 311 the data may be converted into differential data by a serializer 480 as shown in FIG. 4b. The serializer 480 comprises a data input and differential outputs comprising a data signal and a compliment data signal input to the data channel 311 in FIG. 4a.

The data signal and compliment data signal of FIG. 4a is connected to a first and second pre-driver horn 440 respectively. The first and second pre-driver horn 440 each comprise a first amplifier 410 coupled to a second amplifier 411 which are powered by Vdd. An amplified data signal output from the first pre-driver horn 440 is connected to a gate connection of a first p-channel MOSFET 421. An amplified complement data signal output from the second pre-driver horn 440 is connected to a gate connection of a second p-channel MOSFET 422. A drain connection of the first p-channel MOSFET 421 is connected to a drain connection of the second p-channel MOSFET 422 and to voltage line Vdd.

A source connection of the first p-channel MOSFET 421 and a source connection of the second p-channel MOSFET 422 are connected to a source connection of a first n-channel MOSFET 341 and a source connection of a second n-channel MOSFET 432 respectively. A drain connected of the first n-channel MOSFET 431 is connected to a first output pad Tx+ and a drain connection of the second n-channel MOSFET 432 is connected to a second output pad TX−. The first and second output pads are coupled to a transmission channel coupled to terminating resistors at the receiver side. A respective gate connection of the first and second n-channel MOSFET 431 and 432 is connected to a voltage line Vcsc generated by the clock channel cascode generation means 370.

Figure 5A:
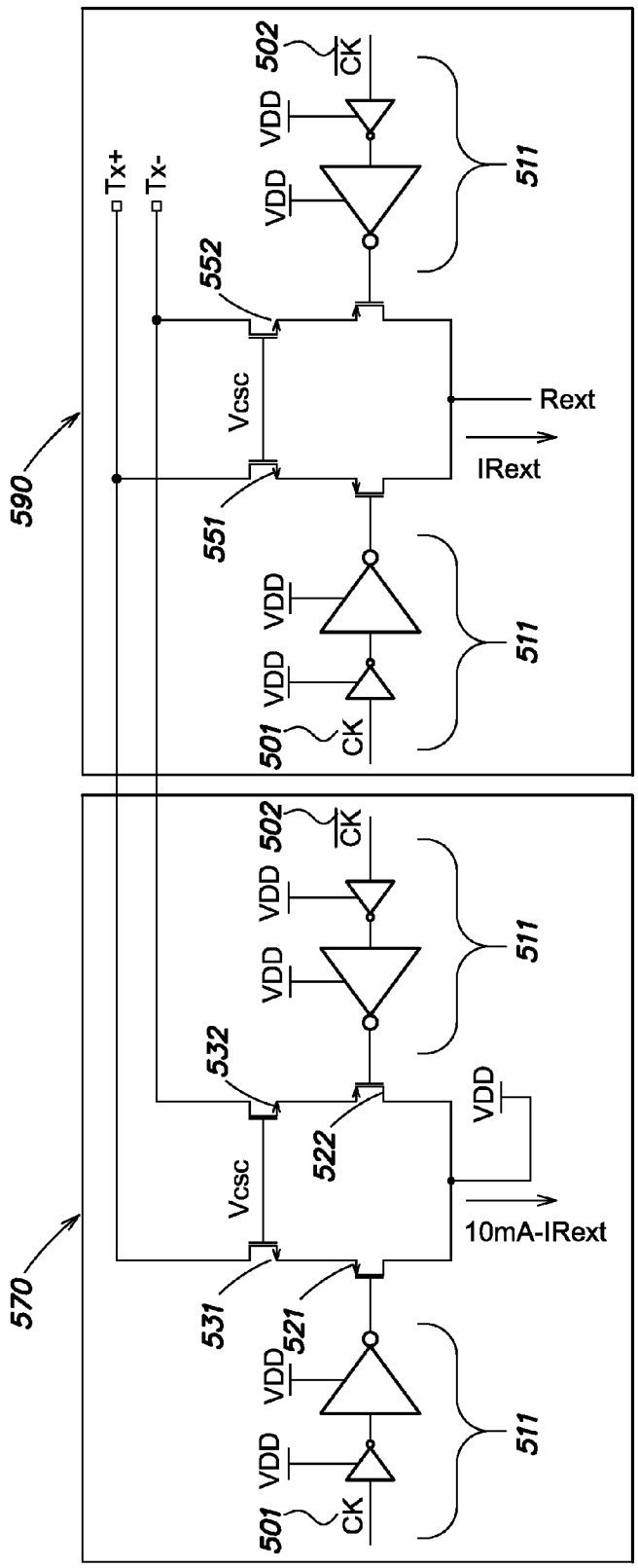
Figure 5B:
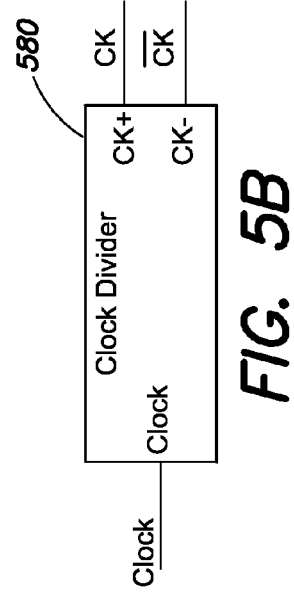
FIG. 5b shows a clock divider.

The clock channel 310 is shown in FIG. 5a. The clock channel 310 comprises a first differential transistor circuit 570 and a second differential transistor circuit 590, each of which receive a clock signal CK and a compliment clock signal !CK from a clock divider 580 shown in FIG. 5b. The clock divider 580 may receive a clock input and divide it into a differential clock output comprising the clock signal CK and the compliment clock signal !CK.

Similarly to the data channel 311, the first differential transistor circuit 570 of the clock channel circuitry 310 of FIG. 5a comprises a first p-channel transistor 521 with a source connection of the first p-channel transistor 521 connected to a source connection of a first n-channel cascode transistor 531 and a second p-channel transistor 522. A source connection of the second p-channel transistors 522 is connected to a source connection of a second n-channel cascode transistor 532. A drain connection of the first p-channel transistor 521 is connected to a drain connection of the second p-channel transistor 522. A drain connection of the first and second n-channel transistor 531 and 532 is connected to a first and second output pad of the clock channel TX+ and TX− respectively. The output pads Tx+ and Tx− may connect to transmission lines TxCKP and TxCKN respectively. A respective gate connection of the first and second n-channel transistor 531 and 532 is connected to line Vcsc and a respective gate of the first and second p-channel transistors 521 and 522 is connected to a clock CK and compliment clock !CK signal amplified by a first and second pre-driver horn 511. The drain connection of the first and second p-channel transistors 521 and 522 is further connected to the line Vdd.

The second differential transistor circuit 590 comprises a third p-channel transistor 541 with a source connection of the third p-channel transistor 541 connected to a source connection of a third n-channel cascode transistor 551 and a fourth p-channel transistor 542 with a source connection of the fourth p-channel transistors 542 connected to a source connection of a fourth n-channel cascode transistor 552. A drain connection of the third p-channel transistor 541 is connected to a drain connection of the fourth p-channel transistor 542. A drain connection of the third and fourth n-channel transistor 551 and 552 is connected to the first and second output pad of the clock channel TX+ and TX− respectively. A respective gate connection of the third and fourth n-channel transistor 551 and 552 is connected to line Vcsc and a respective gate of the third and fourth p-channel transistors 541 and 542 is connected to a clock CK and compliment clock !CK signal amplified by a third and fourth pre-driver horn 511. The drain connection of the third and fourth p-channel transistors 541 and 542 is further connected to the external resistor 360.

Figure 6:
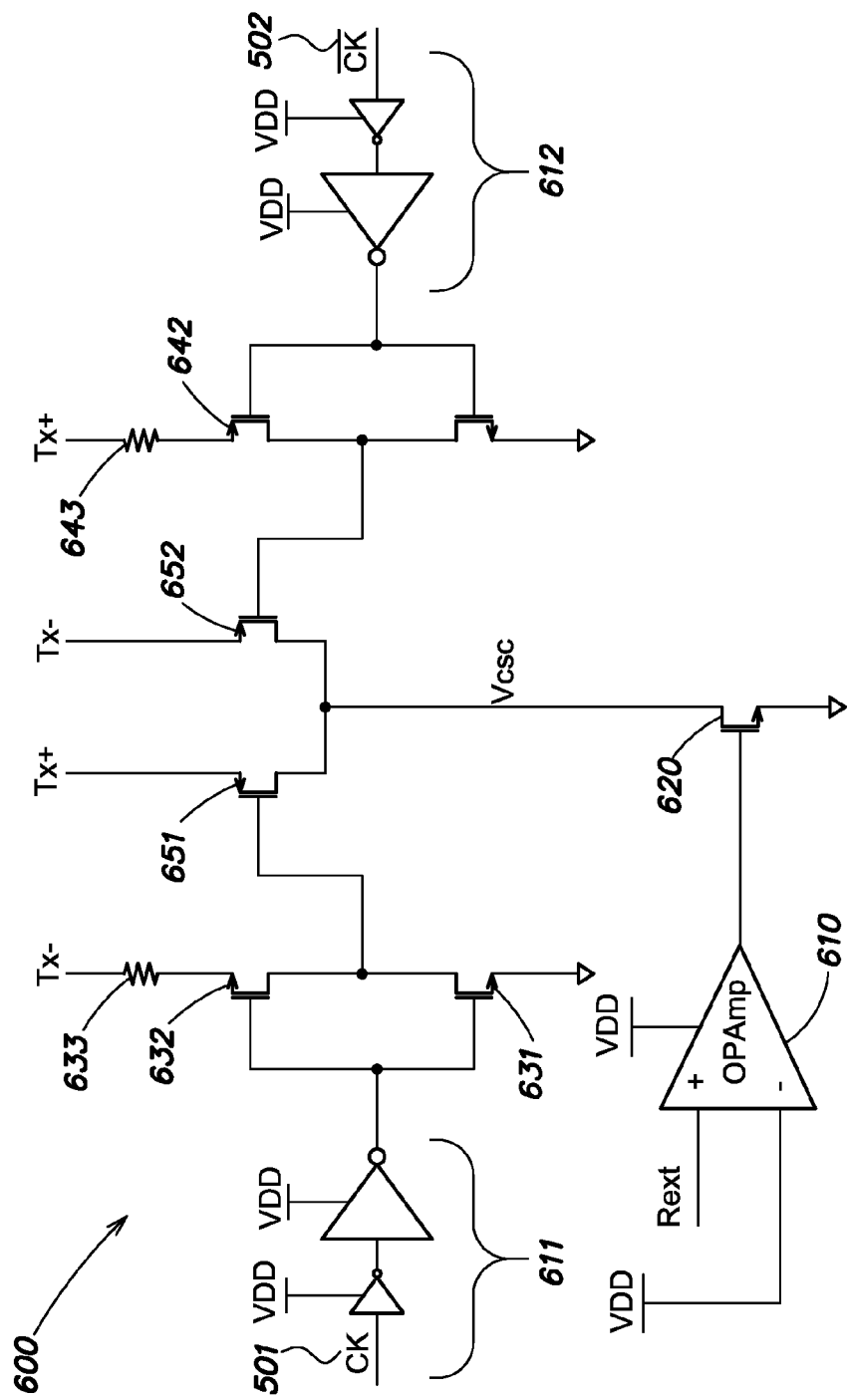
FIG. 6 shows the circuit diagram of a bias signal.

The Vcsc signal is generated by the clock channel cascode generation circuit 600 in FIG. 6. The clock CK and complement clock !CK signal from the clock divider 580 is input into a first and second pre-driver horn 611 and 612.

The output of the first pre-driver horn 611 is connected to a gate connection of a first n-channel MOSFET 631 and a first p-channel MOSFET 632. A source connection of the first n-channel MOSFET 631 is connected to ground while a source connection of the first p-channel MOSFET 632 is connected to the pad Tx− via a first resistor 633. A drain connection of the first n-channel MOSFET 631 is connected to a drain connection of the first p-channel MOSFET 632 and to a gate connection of a third p-channel MOSFET 651.

Similarly, the output of the second pre-driver horn 612 is connected to a gate connection of a second n-channel MOSFET 641 and a second p-channel MOSFET 642. A source connection of the second n-channel MOSFET 641 is connected to ground while a source connection of the second p-channel MOSFET 642 is connected to the pad Tx− via a second resistor 643. A drain connection of the second n-channel MOSFET 641 is connected to a drain connection of the second p-channel MOSFET 642 and to a gate connection of a fourth p-channel MOSFET 652.

A source connection of the third p-channel MOSFET 651 and a source connection of the fourth p-channel MOSFET 652 is connected to the pad Tx+ and pad Tx− respectively. A drain connection of the third p-channel MOSFET 651 is connected to a drain connection of the fourth p-channel MOSFET 652 and provides the voltage Vcsc.

The drain connection of the third p-channel MOSFET 651 and drain connection of the fourth p-channel MOSFET 652 is further connected to a third n-channel MOSFET 620 with a source of the third n-channel MOSFET 620 connected to ground.

A gate connection of the third n-channel MOSFET 620 is connected to the output of an operational amplifier 610 with a first input connected to the external resistor 360 and an inverting input connected to the Vdd line.

The above described circuitry may allow logic at the transmitter to be supplied by a voltage generated by harvesting power supplied to the transmitter from the receiver without the use of voltage boosting circuitry.

In use, the data channels 311, 312, 313 may transmit differential data to the receiver over the transmission lines Tx0P and Tx0N, Tx1P and Tx1N, Tx2P and Tx2N respectively. The differential pair of transistors 421 and 422 are driven by the input differential data and behave like differential switches. The current through the switches may be determined by n-channel MOSFETS 431 and 432 which are connected in cascode with the respective p-channel transistors 421 and 422. The current through the switches may be controlled by the cascode drive voltage Vcsc applied to the gate connection of n-channel MOSFET transistors 431 and 432.

The current through the switches from each of the data channels 311, 312 and 313 is passed via the Vdd line to the shunt regulator 320 and the capacitor 350. The shunt regulator 320 and the capacitor 350 may form a voltage regulator and provide the voltage Vdd using power harvested from the current through the switches 421 and 422 from the receiver supply.

The configuration of the data channel 311 is such that the first and second pre-driver horn 411 with Vdd as its source, is capable of amplifying the input data and compliment data such that it may switch the p-channel transistors 421 and 422 effectively. In embodiments the source Vdd is sufficient for the predriver horn 411 to amplify the data and complement data such that they may switch the p-channel transistors 421 and 422 effectively under the following conditions:

$$V_{csc} - V_{tn} <= V_{dd} + V_{tp} \quad (1)$$

Where Vcscs is the cascode drive voltage applied to the gates of the n-channel MOSFET transistors 431 and 432, Vtn is the threshold voltage of the n-channel transistors, Vtp is the threshold voltage of the p-channel transistors and Vdd is the voltage generated from the harvested receiver current and corresponds to an amplified high data input signal to the gate of the transistor 421. In this case, the power provided to the pre-driver horn 440 need not be boosted.

The cascode drive voltage Vcsc drives the transistors 431 and 432 into active operation. The voltage at the source connection of the p-channel transistors and drain of the n-channel transistors is Vcsc−Vtn. When the data input is low, the difference between Vcsc−Vtn and the data input is greater than Vtp and sufficient to turn the p-channel transistor 421 on. When the data input amplified by the pre-driver horn 440 is high, it is sufficient to turn the p-channel transistor off if Vcsc−Vtn is less than or equal to the data input at the transistor 421 plus the threshold voltage for that transistor. In embodiments Vcsc is generated such that the condition of equation 1 is satisfied. It will be appreciated that the compliment branch of the data channel comprising p-channel transistor 422 and n-channel transistor 432 behaves similarly.

The first differential transistor circuit 570 of the clock channel behaves similarly to the data channel 311, 312, 313. A clock signal is fed into the clock divider in FIG. 5b which divides the clock signal into differential clock signals −CK and !CK. These clock signals are respectively amplified by the first and second pre-horn driver 511 and drive the first and second p-channel transistors 521 and 522 which behave as differential switches. The first and second n-channel transistors 531 and 532 determine the current through the switches based on the cascode drive voltage Vcsc applied at the first and second n-channel transistor 531 and 532 gates. The differential behavior of the first and second p-channel transistors 521 and 522 ensure that a continuous current is passed to the Vdd line. The current pulled from the receiver through the first differential transistor circuit 570 is therefore passed to the Vdd line where it may be used to generate a voltage Vdd to power the transmitter.

Similarly to the data channels, Vdd is harvested from the current through the differential switches 521 and 522. Vdd is sufficient to amplify the clock CK and compliment clock !CK signals to provide a voltage at the gate of transistors 521 and 522 sufficient to turn the transistors off. In other words, Vcsc is generated such that the resulting voltage at the source connections of transistors 521 and 522 is less than the required voltage for the source connections to turn the transistors 521 and 522 on. In this manner, a high clock or complement clock amplified by the pre-driver horn 511 driven by the harvested voltage Vdd is sufficient to turn the transistors 521 and 522 off.

While the drive current of the first differential transistor circuit 570 may be used to generate Vdd, a drive current through the second differential transistor circuit 590 may used in the generation of the cascode drive voltage Vcsc. The second differential transistor circuit 590 behaves similarly to the first differential transistor circuit 570 except that the drive current through the third and fourth p-channel transistors 541 and 542 is sunk to ground through the external resistor 360. The resulting voltage of the drive current in the external resistor 360 is used to generate Vcsc.

Additionally the transistor coefficients of the first and second differential transistor circuit 570 and 590 may differ. The transistors 521, 522, 531 and 532 of the first differential transistor circuit 570 may have a coefficient corresponding to K where:

$$K = \frac{(10 \text{ mA} - I_{Rext})}{I_{Rext}} \quad (2)$$

Where IRext is the drive current through transistors 541 and 542 of the second differential transistor circuit 590. In some embodiments, the drive current may be determined in accordance with HDMI operation and may be 10 mA. In this embodiment the clock channel 310 may draws 10 mA in accordance with the HDMI specification while the current is shared with the first differential transistor circuit 570 drawing 10 mA-IRext and the second differential transistor circuit 590 drawing IRext. In this manner only IRext drawn by the clock channel 310 is used to generate Vcsc, while the rest of the 10 mA-IRext is used to harvest Vdd. It will be appreciated that this is by way of example only and any required drive current may be substituted. For example the current per channel may differ according to other specifications.

The transistors 551, 552, 541 and 542 of the second differential transistor circuit 390 may have a coefficient of 1 and the current sank through the external resistor 360 may be:

$$IRext = Vdd/Rext$$

as determined by the external resistor.

In some embodiments, the coefficients may be chosen such that IRext is much smaller than 10 mA and therefore only a small portion of the current drawn from the receiver is used for the generation of Vcsc while the majority of the 10 mA can be harvested to generate Vdd.

For example, in some embodiments the coefficients may be chosen such that IRext is 5% of the current drawn by the clock channel 310. For example where that clock channel draws 10 mA and Vdd is 1.2V, then Rext is chosen to be 2.4 kΩ to provide an IRext of 0.5 mA.

The clock channel cascode generation means 370 of FIG. 3 may comprise the second differential transistor circuit 590 and cascode voltage generation means 600 as shown in FIG. 6. Circuit 600 of FIG. 6 generates the Vcsc voltage.

The pre-driver horn amplifiers 611 and 612 amplify the input clock CK and complement clock !CK signal respectively. The amplified clock and complement clock signals are used to drive respective transistors 632, 631 and 642, 641. Transistors 632 and 631 form a first inverter that buffers and inverts the clock signal. Transistors 642 and 641 form a second inverter that buffers and inverts the complement clock signal. The buffered amplified clock signal and buffered amplified complement clock signal is used to drive the differential pair of p-channel transistors 651 and 652 which mimic the operation of the differential transistors of the data channels.

The buffered amplified clock and complement clock signals drive the third and fourth p-channel differential pair transistors 651 and 652 into an active or saturation mode. In this manner the current through the third n-channel transistor 620 is set. This current may be set such that the current sunk into ground at the source connection of the third n-channel transistor and at the source connections of the first and second n-channel transistors is negligible compared to the total current drawn from the receiver. For example, in an HDMI embodiment where each channel draws 10ma, this current may be in the order of 200 uA. In embodiments, this current may not have a significant effect on the potential power harvested from the receiver.

The third n-channel transistor 620 sets may control the value of Vcsc. The voltage across the external resistor may be used as a measurement of the drive current of the second differential transistor circuit which in turn may be a measurement of the cascode drive voltage Vcsc. The voltage Vcsc is set such that the an Irext generated in the second differential transistor circuit will invoke a voltage equal to Vdd in the external resistor. The operational amplifier 610 may use the voltage across the external resistor 360 in order to set the voltage Vcsc. In this manner Vcsc may be controlled to provide the required drive current for each pair of differential transistors in each channel 310, 311, 312, 313.

The third n-channel transistor may be biased on in a linear operation by the output of the operation amplifier 610. The current through the third n-channel transistor 620 is set by the third and fourth p-channel differential transistor pair 651 and 652. A gate source voltage determined by the output of the operational amplifier 610 of the third p-channel transistor controls a drain source voltage of the third n-channel transistor 620. The drain source voltage provides Vcsc.

In this manner, the cascode drive voltage Vcsc may be set using a feedback from the external resistor Rext and negligible sink current.

Embodiments harvest power from the receiver to power the transmitter. The start-up circuit may be used as an alternative path to power the transmitter when harvested power is not available.

The start-up circuit as shown in FIG. 3b is used to provide Vdd at start up or when the transmitter is in a power down mode. When in start-up or power down mode, the start up circuit 330 is connected to the transmit pads Tx– and Tx+. Current flows from the receiver source through the first and second terminating resistor of the receiver and first and second start-up resistor 331 and 332 respectively and the resulting voltage drop across the resistors provide a voltage on the Vdd line. The resistance values of the first and second start up resistors 331 and 332 may be chosen such that Vdd is provided in accordance with the requirements of the transmitter.

The resistors may be chosen such that a very low current flows through them when they are connected. This may in accordance with the current requirements of the HDMI specification when the transmitter is in an off mode.

In some embodiments, the low current through the resistors provide a power at start up such that the transmitter may start harvesting power through the channels.

In some embodiments, the start up circuit may be disconnected after a period of time, for example once the harvested voltage Vdd settles. In other embodiments, the start up circuit may remain connected. In this case, the start up circuit will draw a low current well within the limits defined by the HDMI specification.

In some embodiments a start up circuit is provided for each channel.

It will be appreciated that the foregoing description is by way of example only and various modifications may be obvious to a person skilled in the art.

For example the transistors 641, 642 and resistor 643 and transistors 631, 632 and resistor 633 forming the inverting/buffering circuitry may be replaced by any circuitry suitable for inverting/buffering the differential clock signals.

Although the pre-driver horn circuitry 611, 612, 410, 511 and 512 has been depicted as two operational amplifiers, it may be replaced by any suitable amplifying circuitry.

The clock driver and data serializer may be replaced by any circuitry capable of generating differential signals.

The architecture of the transmitter as shown in FIG. 3a may comprise more or less channels and additional logic circuitry as required by a transmitter. The circuitry may be entirely or partly provided on an integrated circuit. The transmitter and receiver may operate in accordance with HDMI. Embodiments may be an HDMI cable. Furthermore the value of the drive current through the differential transistor pairs of the channels and value of Vdd may be chosen in accordance with HDMI requirement. For example Vdd may be within a range of 1 to 1.2V for some embodiments and the drive current may be 10 mA per channel.

The start up circuit 330 may be of any configuration suitable for providing a voltage on line Vdd.

In embodiments the shunt regulator 320 and capacitor 350 provide a voltage regulator. It will be appreciated that any suitable circuitry may be used for the voltage regulator.

It will be appreciated that the shunt regulator is merely exemplary and the capacitor 350 may omitted in some embodiments. Furthermore in some embodiments the external resistor may be omitted. In some embodiments the resistor may be omitted if the internal resistance is controlled for certain output swing requirements.

The application is being described herein by way of reference to particular non-limiting examples. A person when skilled in the art will understand the general applicability of the application. The scope of protection afforded by the application is to be filed in the appending claims.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A transmitter comprising:
a channel including:
  a differential output line;
  a first differential circuit including: a differential input configured to receive a differential input signal, and a differential output coupled to the differential output line of the channel; and
  a first control circuit coupled between the differential output of the first differential circuit and the differential output line of the channel, the first control circuit having an input configured to receive a first control signal,
wherein the first differential circuit includes a p-channel MOSFET,
wherein the differential output line is configured to couple to a receiver,
wherein the first differential circuit is configured to draw current from the receiver,
wherein a voltage of the first control signal is less than or equal to a voltage of a power supply signal recovered from the current drawn from the receiver plus a threshold voltage of an n-channel MOSFET plus a threshold voltage of a p-channel MOSFET,
wherein the first control signal is provided by a control signal generating circuit having one or more components supplied by a power supply voltage recovered from a drive signal provided at a terminal of the first differential circuit,
wherein:
  the transmitter further comprises the control signal generating circuit;
  the control signal generating circuit includes:
    a second differential circuit driven by the differential input signal; and
    a voltage controller for controlling a voltage of the first control signal in response to a voltage control signal.

2. The transmitter of claim 1, further comprising:
a voltage generation circuit coupled to the first differential circuit and configured to generate the power supply voltage from the drive signal.

3. The transmitter of claim 2, further comprising:
first and second amplifier circuits configured to amplify the differential input signal.

4. The transmitter of claim 3, wherein the first and second amplifiers are powered by the power supply voltage.

5. The transmitter of claim 1, wherein the first differential circuit comprises a first differential transistor pair, which includes the p-channel MOSFET of the first differential circuit.

6. The transmitter of claim 1, wherein the differential output of the first differential circuit comprises an open drain output.

7. The transmitter of claim 1, wherein the first control circuit comprises a cascode transistor pair.

8. The transmitter of claim 2, wherein the voltage generation circuit comprises a voltage regulator.

9. The transmitter of claim 8 wherein the voltage regulator comprises:
a shunt regulator coupled to a capacitor.

10. The transmitter of claim 1, wherein the voltage controller is configured to receive a second drive signal provided at a terminal of the second differential circuit.

11. The transmitter of claim 10, wherein the second differential circuit comprises a differential transistor pair.

12. The transmitter of claim 11, further comprising:
biasing circuitry configured to bias the second differential circuit such that a current of the second drive signal provided at the terminal of the second differential circuit is at least an order of magnitude less than a current of the drive signal provided at the terminal of the first differential circuit.

13. The transmitter of claim 10, wherein the terminal of the second differential circuit is coupled to an external resistor, and the second drive signal generates a voltage across the external resistor.

14. The transmitter of claim 13, wherein the voltage across the external resistor is equal to the power supply voltage when the voltage of the first control signal corresponds to a predetermined value.

15. The transmitter of claim 14, wherein:
the first control circuit comprises a cascode transistor pair.

16. The transmitter of claim 13, wherein the control signal generating circuit further comprises:
a comparator configured to generate the voltage control signal based on a comparison between the power supply voltage and the voltage across the external resistor.

17. The transmitter of claim 1, wherein the voltage controller comprises: a control transistor with a gate configured to receive the voltage control signal and a drain configured to receive the first control signal and a source coupled to ground.

18. The transmitter of claim 1, wherein the transmitter is a HDMI transmitter.

19. The transmitter of claim 18, wherein the transmitter further comprises second, third, and fourth channels.

20. The transmitter of claim 19, wherein the channel, the second channel, the third channel, and/or the fourth channel is a clock channel.

21. A circuit board comprising:
a transmitter having a channel and a voltage regulator, wherein the channel includes:
   a first differential circuit including: a differential input configured to receive a differential input signal, and a differential output coupled to a differential output terminal of the channel; and
   a first control circuit coupled between the differential output of the first differential circuit and the differential output terminal of the channel, the first control circuit having an input configured to receive a control signal,
wherein the voltage regulator is configured to regulate a voltage of a power supply signal recovered from a current drawn by the transmitter from a receiver coupled to the channel,
wherein the voltage of the power supply signal recovered from the current drawn from the receiver is less than a voltage at a node coupled between the first control circuit and the differential output of the first differential circuit, and
wherein a voltage of the control signal is less than or equal to the voltage of the power supply signal recovered from the current drawn from the receiver plus a threshold voltage of an n-channel MOSFET plus a threshold voltage of a p-channel MOSFET.

22. A system comprising:
a high-definition multimedia interface (HDMI) receiver; and
an HDMI transmitter configured to transmit data to the HDMI receiver, the HDMI transmitter having a channel and a voltage regulator,
wherein the channel includes:
   a first differential circuit including: a differential input configured to receive a differential input signal, and a differential output coupled to a differential output terminal of the channel, and
   a first control circuit coupled between the differential output of the first differential circuit and the differential output terminal of the channel, the first control circuit having an input configured to receive a control signal,
wherein the voltage regulator is configured to regulate a voltage of a power supply signal recovered from a current drawn by the HDMI transmitter from the HDMI receiver,
wherein the voltage of the power supply signal recovered from the current drawn from the HDMI receiver is less than a voltage at a node coupled between the first control circuit and the differential output of the first differential circuit, and
wherein a voltage of the control signal is less than or equal to the voltage of the power supply signal recovered from the current drawn from the HDMI receiver plus a threshold voltage of an n-channel MOSFET plus a threshold voltage of a p-channel MOSFET.

23. The circuit board of claim 21, wherein the first differential circuit includes a p-channel MOSFET.

24. The system of claim 22, wherein the first differential circuit includes a p-channel MOSFET.

25. The circuit board of claim 21, wherein the transmitter further includes a control signal generating circuit configured to provide the control signal, and wherein the control signal generating circuit includes one or more components supplied by the power supply signal recovered from the current drawn from the receiver.

26. The system of claim 22, wherein the HDMI transmitter further includes a control signal generating circuit configured to provide the control signal, and wherein the control signal generating circuit includes one or more components supplied by the power supply signal recovered from the current drawn from the receiver.

* * * * *

UNITED STATES PATENT AND TRADEMARK OFFICE
CERTIFICATE OF CORRECTION

PATENT NO. : 8,786,321 B2
APPLICATION NO. : 12/982583
DATED : July 22, 2014
INVENTOR(S) : Nitin Gupta et al.

It is certified that error appears in the above-identified patent and that said Letters Patent is hereby corrected as shown below:

In the Specification:

In column 4, line 46, "$V_{SCS}$" should read --$V_{CSC}$--;
In column 8, line 12, "$V_{CSCS}$" should read --$V_{CSC}$--.

In the Claims:

In column 12, line 28, "2" should read --3--.

Signed and Sealed this
Twenty-fifth Day of November, 2014

Michelle K. Lee
*Deputy Director of the United States Patent and Trademark Office*